United States Patent
Yonezawa et al.

(10) Patent No.: US 8,258,772 B2
(45) Date of Patent: Sep. 4, 2012

(54) DC-DC CONVERTER

(75) Inventors: Yu Yonezawa, Kawasaki (JP); Naoyuki Mishima, Chigasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/033,227

(22) Filed: Feb. 23, 2011

(65) Prior Publication Data
US 2011/0215788 A1 Sep. 8, 2011

Related U.S. Application Data

(63) Continuation of application No. PCT/JP2008/065354, filed on Aug. 28, 2008.

(51) Int. Cl.
*H01F 27/42* (2006.01)

(52) U.S. Cl. .................................. 323/356; 336/221

(58) Field of Classification Search .................. 323/222, 323/248, 250, 282–288, 311–315, 357; 363/21.02, 363/21.14, 17, 65, 95; 336/182–184, 178, 336/212, 234, 221
See application file for complete search history.

(56) References Cited

U.S. PATENT DOCUMENTS

| | | | | |
|---|---|---|---|---|
| 4,210,859 A | * | 7/1980 | Meretsky et al. | 323/331 |
| 4,587,507 A | * | 5/1986 | Takayama et al. | 336/178 |
| 4,695,917 A | * | 9/1987 | Jackson et al. | 361/58 |
| 5,719,546 A | * | 2/1998 | Ito et al. | 336/180 |
| 6,356,176 B1 | * | 3/2002 | Anderson | 335/284 |
| 7,002,333 B2 | * | 2/2006 | Blasco Claret et al. | 323/356 |
| 7,256,678 B2 | * | 8/2007 | Haugs et al. | 336/212 |
| 7,863,756 B2 | * | 1/2011 | Uno et al. | 257/777 |

FOREIGN PATENT DOCUMENTS

| | | |
|---|---|---|
| JP | 2003-142319 | 5/2003 |
| WO | 2008/084684 | 7/2008 |

OTHER PUBLICATIONS

John G. Kassakian, et al., "Principles of Power Electronics," Addison-Wesley Publishing Company, pp. 674-687, Jun. 1992.
International Search Report for International Application No. PCT/JP2008/065354 mailed Dec. 2, 2008.

* cited by examiner

*Primary Examiner* — Rajnikant Patel
(74) *Attorney, Agent, or Firm* — Staas & Halsey LLP

(57) ABSTRACT

The present invention is a DC-DC converter characterized by including a switch element that is provided between one end of a DC power source and one end of a load and turns ON and OFF current input from the DC power source, an inductance element that is provided between one end of the switch element on a load-side end and includes a doughnut-shaped magnetic core and a conductive wire wound around the magnetic core, a commutation switch provided between a node between the switch element and the inductance element and a ground potential, and a capacitance element provided between a node between the inductance element and the load and the ground potential, wherein a magnetic flux density of the magnetic core varies partially.

8 Claims, 11 Drawing Sheets

CURRENT
SMALL

CURRENT

CURRENT
MIDDLE

CURRENT

CURRENT
LARGE

CURRENT

US 8,258,772 B2

DC-DC CONVERTER

CROSS-REFERENCE TO RELATED APPLICATION

This application is a continuation application of PCT/JP2008/065354 filed Aug. 28, 2008, the contents of which are herein wholly incorporated by reference

FIELD

A certain aspect of the present invention is related to a DC-DC converter.

BACKGROUND

A DC-DC converter of, for example, a step down type is used in information devices. A switching power supply using a switch is employed in the DC-DC converter. A back type switching power supply is used in a case where grounds of input and output are commonly used (Non-Patent Document 1). Non-Patent Document 1: Jon G, Kassakian, Principles of power electronics, ADDISON-WESLEY PUBLISHING COMPANY, 1992, pp. 674-687

SUMMARY

According to an aspect of the present invention, there is provided a DC-DC converter characterized by comprising: a switch element that is provided between one end of a DC power source and one end of a load and turns ON and OFF current input from the DC power source; an inductance element that is provided between one end of the switch element on a load-side end and includes a doughnut-shaped magnetic core and a conductive wire wound around the magnetic core; a commutation switch provided between a node between the switch element and the inductance element and a ground potential; and a capacitance element provided between a node between the inductance element and the load and the ground potential, wherein a magnetic flux density of the magnetic core varies partially.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
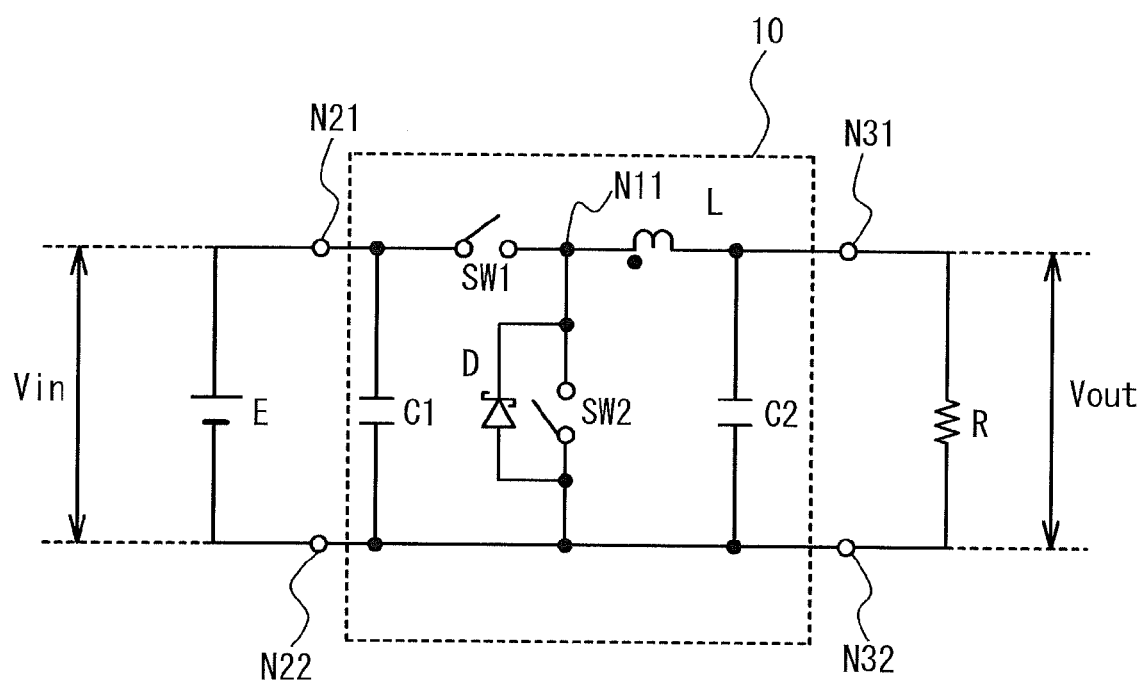
FIG. 1 is a circuit diagram of a DC-DC converter in accordance with a comparative example 1.

First, a problem to be solved by the present invention is described by referring to a comparative example 1. FIG. 1 is a circuit diagram of a general step down type DC-DC converter having an output voltage lower than an input voltage in accordance with the comparative example 1. Referring to FIG. 1, a DC power source E and a load R are connected to a DC-DC converter 10. A positive-side terminal of the DC power source E is connected to a node N21, and a negative-side terminal thereof is connected to a node N22. A positive-side terminal of the resistor R is connected to a node N31, and a negative-side terminal thereof is connected to a node N32. The nodes N22 and N32 are ground terminals, and are directly connected to each other.

The DC-DC converter 10 has a first switch SW1, a second switch SW2, a capacitance element C1, a capacitance element C2, an inductance element L, and a Schottky barrier diode D. The first switch SW1 is provided between the node 21 and the node N31. The inductance element L is connected to the load side of the first switch SW1. N11 is a node between the first switch SW1 and the inductance element L. The second switch SW2 and the Schottky barrier diode D are commutation elements and are connected between the node N11 and the node N22. The capacitance element C1 is an input smoothing capacitor, and is connected between the node N21 and N22. The capacitance C2 is an output smoothing capacitor and is connected between the node N31 and the node N32.

Semiconductor switches, which may be MOSFETs (Metal Oxide Semiconductor Field Effect Transistors), for example, may be used as the first switch SW1 and the second switch SW2. The first switch SW1 and the second switch SW2 are alternately turned ON and OFF repeatedly. A voltage Vout applied to the load R is calculated as follows:

$$Vout=(ton/tp) \times Vin$$

where tp is a period with which the first switch SW1 is turned ON and OFF, ton is the width of a time during which the first switch SW1 is ON, and E is the input voltage of the DC power source E.

Figure 2:
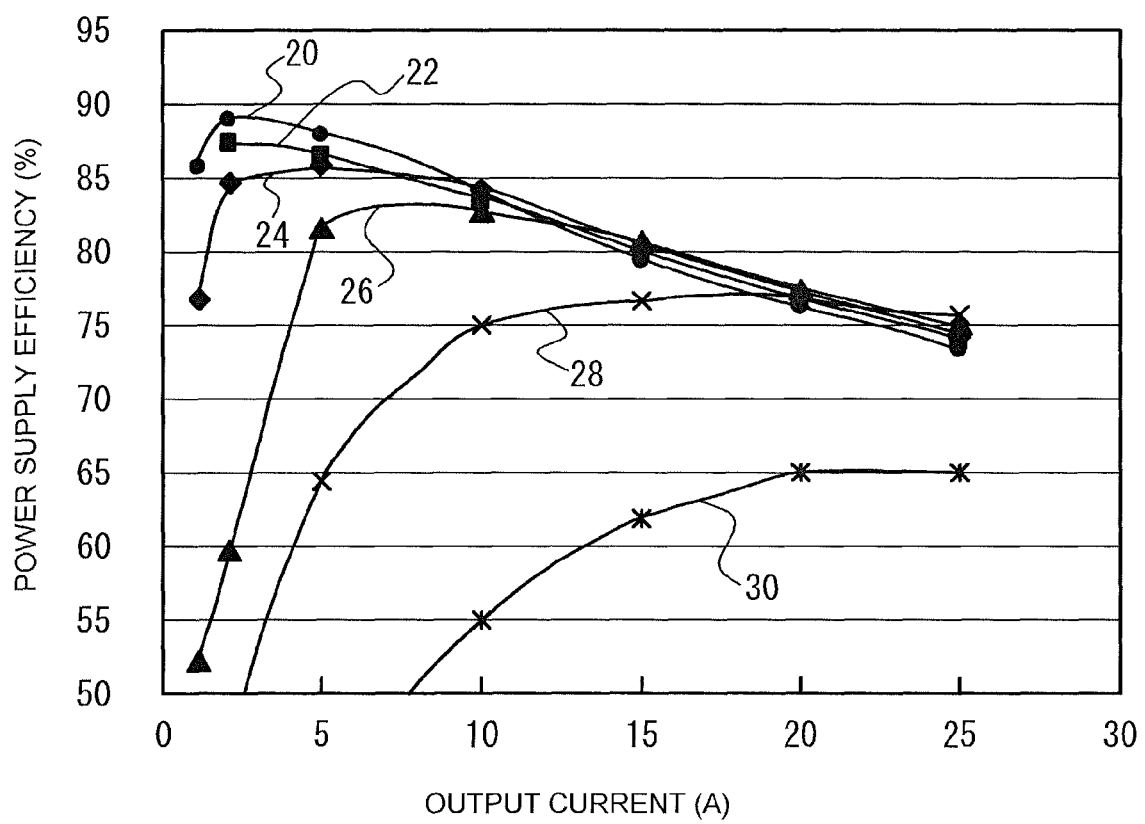
FIG. 2 is a graph that illustrates a change of the power supply efficiency in relation to a change of the output current of the DC-DC converter of the comparative example 1 by a circuit simulation.

FIG. 2 is a graph that illustrates results of a circuit simulation regarding a change of the power supply efficiency in relation to a change of the output current of the DC-DC converter 10. Points described by symbols are the results of the circuit simulation, and solid lines 20, 22, 24, 26, 28 and 30 are lines that connect the results of the simulation. The horizontal line indicates the output current, and the vertical line indicates the power supply efficiency. The power supply efficiency 11 is described as follows.

$$\eta = Pout/Pin$$

where Pin is the input power of the DC power source E, and Pout is the output power of the load R. In the circuit simulation, the first switch SW1 and the second switch SW2 use SPICE parameters of IRFRU3711Z. The Schottky barrier diode D uses a SPICE parameter of MBR20100CT. The capacitors C1 and C2 are 270 pF and 820 pF, respectively. The switching frequency is 1 MHz. The solid lines 20, 22, 24, 26, 28 and 30 correspond to cases where the inductance element L has inductance values of 480 nH, 240 nH, 120 nH, 60 nH, 30 nH and 15 nH, respectively.

Referring to FIG. 2, in a case where the inductance element L has a large inductance value, for example, in the solid line 20 corresponding to an inductance value of 480 nH, the power supply efficiency is high when the output current is small. However, as the output current increases, the power supply efficiency degrades approximately linearly. In contrast, when the inductance value is small, for example, in the solid line 28 corresponding to an inductance value of 30 nH, the power supply efficiency is low when the output current is small, and becomes higher as the output current becomes larger. In a case where the output current is about 25 Å, the power supply efficiencies for inductance values of 480 nH and 30 nH are nearly equal to each other, as indicated by the solid lines 20 and 28, respectively. In a case where the inductance value is much smaller and is 15 nH, the power supply efficiency is low even for an output current of about 25 Å, as indicated by the solid line 30.

Figure 3:
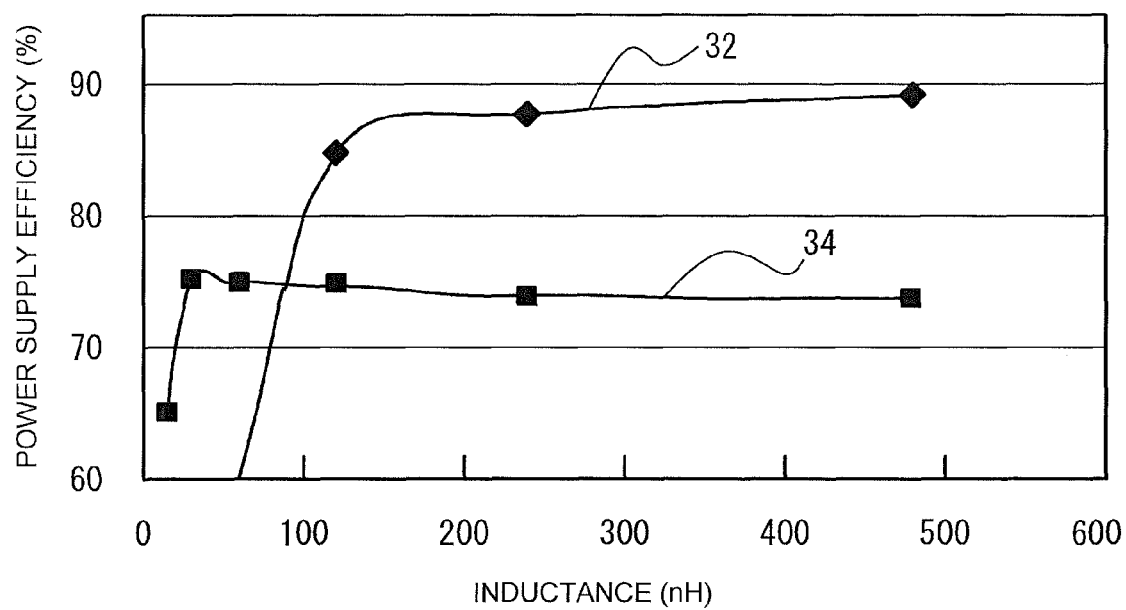
FIG. 3 is a graph that illustrates a change of the power supply efficiency in relation to a change of the inductance value of an inductance element employed in the comparative example 1 by a circuit simulation.

FIG. 3 is a graph illustrating results of a circuit simulation regarding a change of the power supply efficiency in relation to a change of the inductance value of the inductance element L of the DC-DC converter 10. Points described by symbols are the results of the circuit simulation, and solid lines 32 and 34 are lines that connect the results of the simulation. The horizontal line indicates the inductance value, and the vertical line indicates the power supply efficiency. The parameters of the elements used in the circuit simulation are the same as those of the circuit simulation illustrated in FIG. 2. The solid lines 32 and 34 correspond to cases where the output current is 2 A and 25 A, respectively.

Referring to FIG. 3, for the case of an output current of 2 A, the power supply efficiency is high when the inductance value is large, and decreases rapidly when the inductance value becomes low, as indicated by the solid line 32. For the case of an output current of 25 A, the power supply efficiency becomes the highest when the inductance value is about 30 nH and decreases gradually as the inductance value increases.

From FIGS. 2 and 3, generally, the power supply efficiency of the DC-DC converter 10 is high when the inductance element L has a large inductance value.

Figure 4:
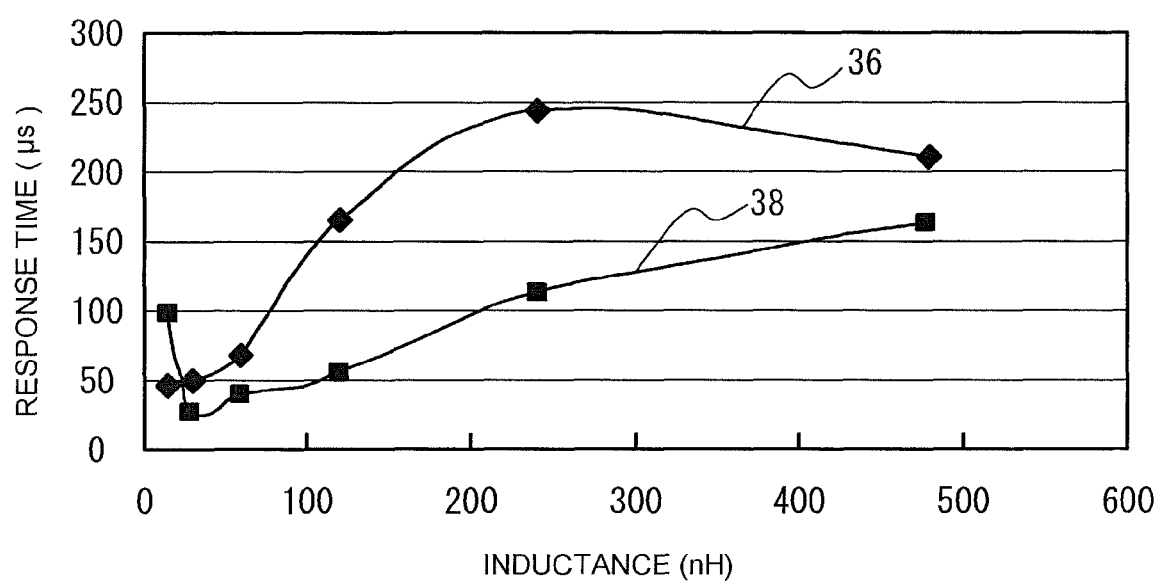
FIG. 4 is a graph that illustrates a change of the response time in relation to a change of the inductance value of an inductance element employed in the comparative example 1 by a circuit simulation.

FIG. 4 is a graph illustrating results of a circuit simulation regarding a change of the response time of the DC-DC converter 10 in relation to a change of the inductance value of the inductance element L. Points described by symbols are the results of the circuit simulation, and solid lines 36 and 38 are lines that connect the results of the simulation. The horizontal line indicates the inductance value, and the vertical line indicates the response time. The parameters of the elements used in the circuit simulation are the same as those of the circuit simulation illustrated in FIG. 2. The response time corresponds to the time it takes for the output current or the output voltage to converge to a range of ±1% of the value at which the output current or the output voltage is balanced. That is, when the response time is short, the response speed at which the output current of the DC-DC converter reaches the balanced state is high. Generally, it is preferable that the response speed is high. The solid lines 36 and 38 correspond to cases where the output current is 2 A and 25 A, respectively.

Referring to FIG. 4, for both cases of output currents of 2 A and 25 A, as the inductance value becomes smaller, the response time becomes shorter, as indicated by the solid lines 36 and 38. Thus, generally, the response speed of the switching power supply illustrated in FIG. 1 is high when the inductance element L has a small inductance value.

From FIGS. 3 and 4, the power supply efficiency and the response speed of the DC-DC converter 10 have a trade-off relation. That is, when the inductance value of the inductance element L is increased to improve the power supply efficiency, the response speed becomes low. In contrast, when the inductance value of the inductance element L is decreased to improve the response speed, the power supply efficiency becomes low. Particularly, this is conspicuous when the power supply efficiency is low.

Figure 5:
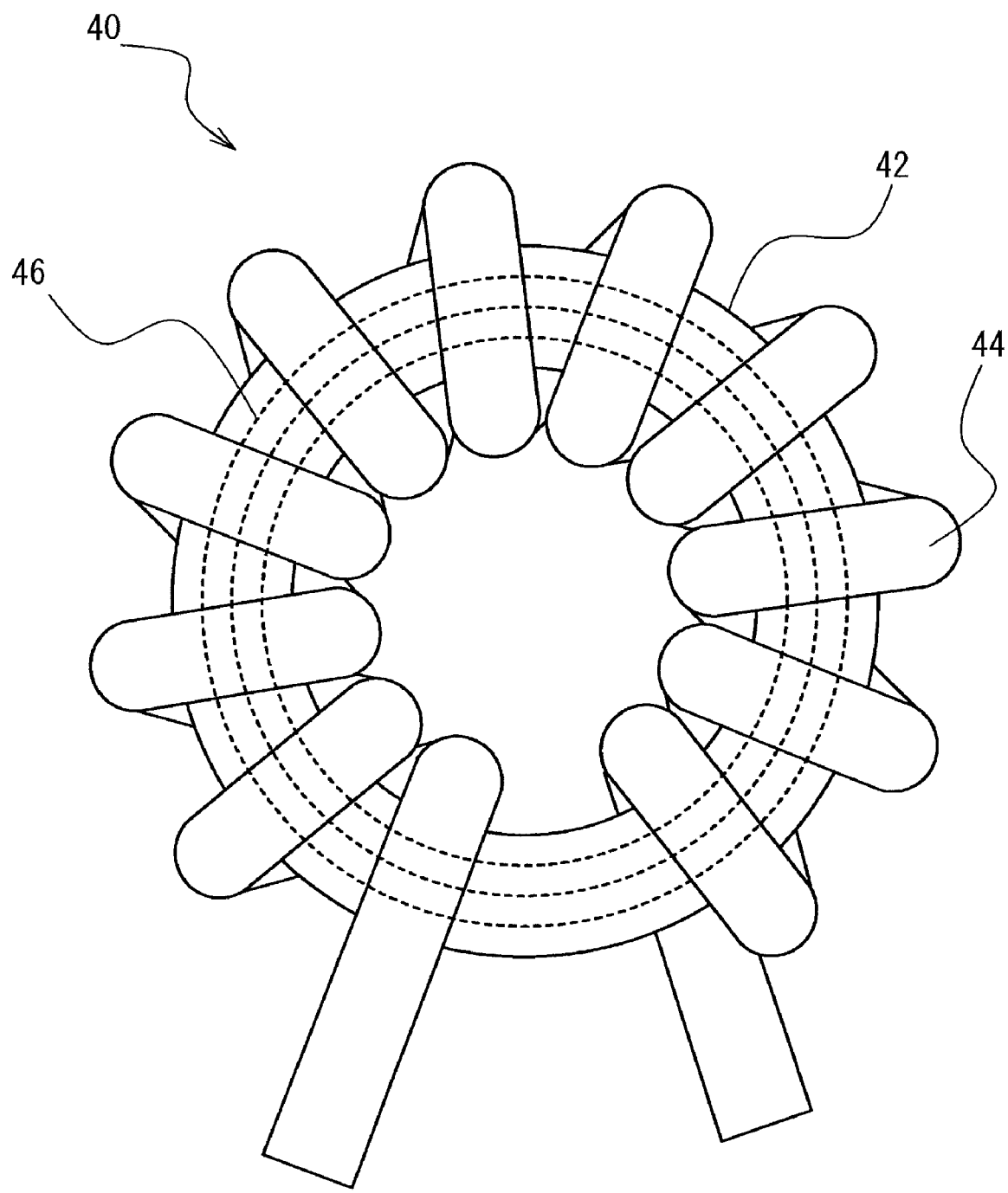
FIG. 5 is a diagram that illustrates a structure of an inductance element generally used in the DC-DC converter circuit of the comparative example 1.

FIG. 5 is a diagram of a structure of an inductance element 40 generally used in the DC-DC converter circuit illustrated in FIG. 1. Referring to FIG. 5, the inductance element 40 has a doughnut-shaped magnetic core 42 around which a conductive wire 44 is wound, and is called toroidal type. The material of the magnetic core 42 is, for example, ferrite, sendust, or iron. When a current flows through the conductive wire 44, a magnetic flux 46 is generated within the magnetic core 42. The magnetic flux 46 is illustrated by broken lines. Since the doughnut-shaped magnetic core 42 generally used is formed to have a uniform cross-sectional area taken along a plane including the central axis of the magnetic core 42, the magnetic flux density in the magnetic core 42 is also uniform. The magnetic flux 46 of the magnetic core 42 increases in proportion to the magnitude of the current that flows through the conductive wire 44. The magnetic flux density has a limit due to the property of the material of the magnetic core 42. Thus, when the magnitude of the current that flows through the conductive wire 44 exceeds a predetermined value, the magnetic flux 46 starts to leak from the inside of the magnetic core 42 to the outside air. At this time, the inductance value of the inductance element 40 decreases rapidly since the air permeability is extremely smaller than the permeability of the magnetic core 42.

In the DC-DC converter 10, when the output current increases and the inductance value of the inductance element 40 decreases rapidly, as illustrated in FIG. 3, the power supply efficiency degrades and the current that flows through the inductance element 40 increases rapidly. Thus, the inductance element 40 may be burned due to heat generated and the DC-DC converter 10 and may be destroyed. Thus, usually, a tolerable range of the output current of the DC-DC converter 10 is defined to prevent the magnetic flux density of the inductance element from being saturated.

Figure 6:
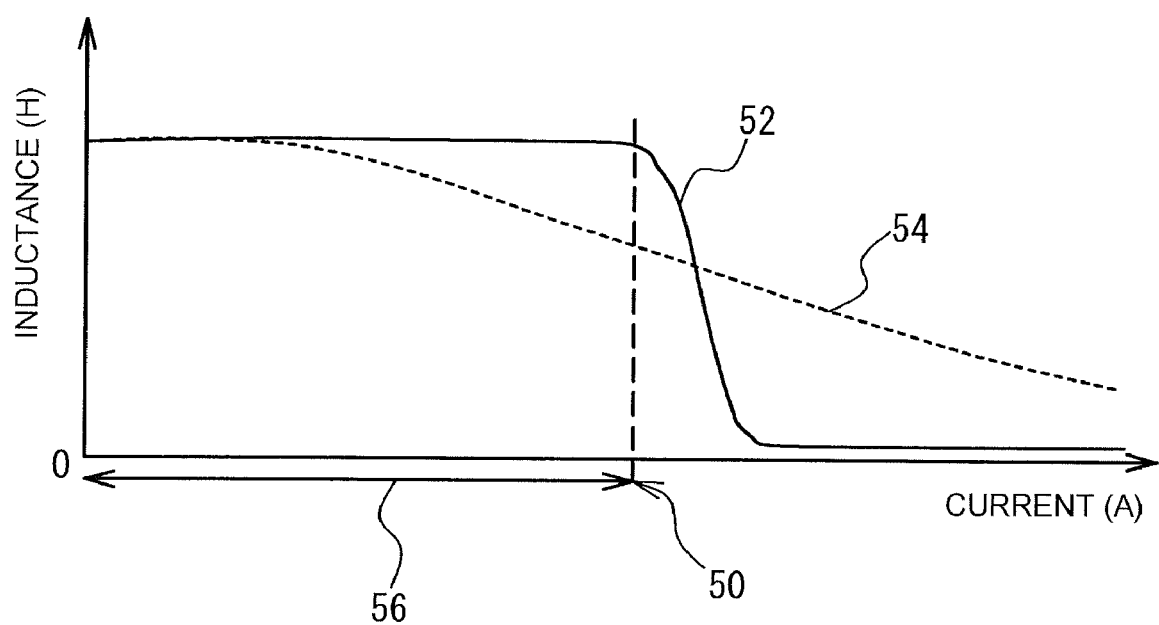
FIG. 6 is a graph that illustrates a characteristic of the inductance value of the inductance element involved in the comparative example and an embodiment 1.

FIG. 6 is a graph of a characteristic of the inductance value of an inductance element. The horizontal axis of the graph indicates a current that flows through the inductance element, and the vertical axis indicates the inductance value. A solid line 52 corresponds to the inductance element 40 of the comparative example 1, and a broken line 54 corresponds to an inductance element of an embodiment 1, which will be described later. Referring to FIG. 6, a range 56 from a current of 0 to a predetermined value of 50 is a tolerable range of the current in which the magnetic flux density of the inductance element 40 of the comparative example 1 is not saturated. Within the tolerable range corresponding to the range 56 of the current, as indicated by the solid line 52, the inductance value is not changed but is a constant value. When the current exceeds the tolerable range, the magnetic flux begins to leak, and the inductance value decreases rapidly, as indicated by the solid line 52.

In order to improve the response speed of the DC-DC converter 10, from FIG. 4, it is desired that the inductance value of the inductance element 40 is decreased. However, there is a problem that decreasing the inductance value of the inductance element 40 degrades the power supply efficiency, as seen from FIG. 3.

Embodiment 1

A description will now be given of an embodiment 1 solving the problem of the comparative example 1 with reference to the drawings.

The DC-DC converter of the embodiment 1 has a circuit configuration similar to that of the comparative example 1 illustrated in FIG. 1, and a description thereof is omitted here. The embodiment 1 differs from the comparative example 1 in that the embodiment 1 employs an inductance element 60 illustrated in FIG. 7 as the inductance element L.

Figure 7:
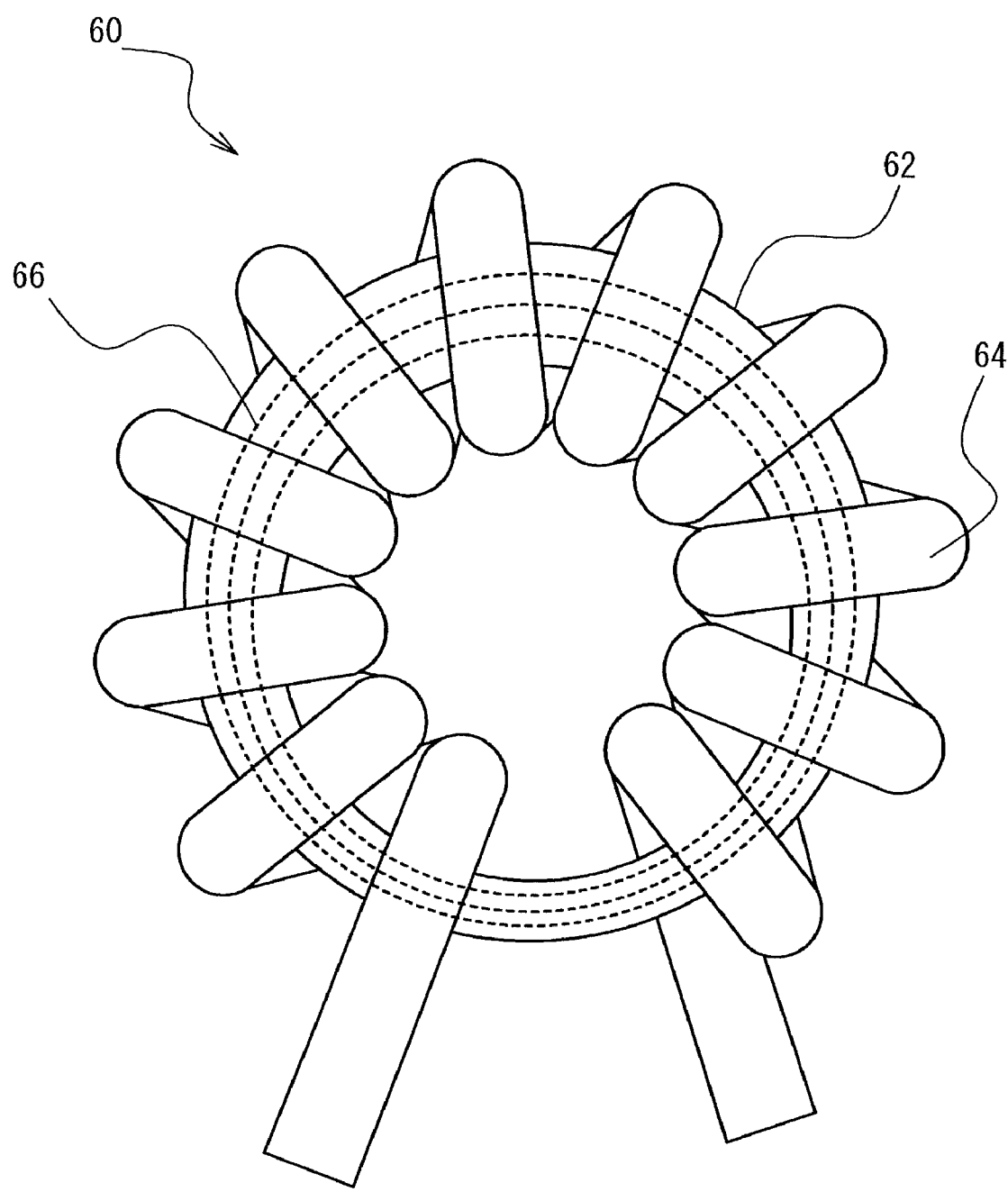
FIG. 7 is a diagram that illustrates a structure of an inductance element employed in the embodiment 1.

FIG. 7 is a diagram illustrating a structure of the inductance element 60. The inductance element 60 is structured so that a conductive wire 64 is wound around a doughnut-shaped magnetic core 62 like the inductance element 40 in FIG. 5. The material of the magnetic core 62 may be ferrite, sendust, iron or the like. A magnetic flux 66 is generated within the magnetic core 62 when a current flows through the conductive wire 64. The magnetic flux 66 is illustrated by broken lines. Unlike the inductance element 40 of FIG. 5, the magnetic flux density of the doughnut-shaped magnetic core 62 employed in the inductance element 60 varies partially. Further, the cross-sectional area of the doughnut-shaped magnetic core 62 taken along a plane including the central axis of the magnetic core 62 varies partially. Furthermore, the magnetic core 62 is structured that the center of the outer circumference and that of the inner circumference are different from each other.

Figure 8A:
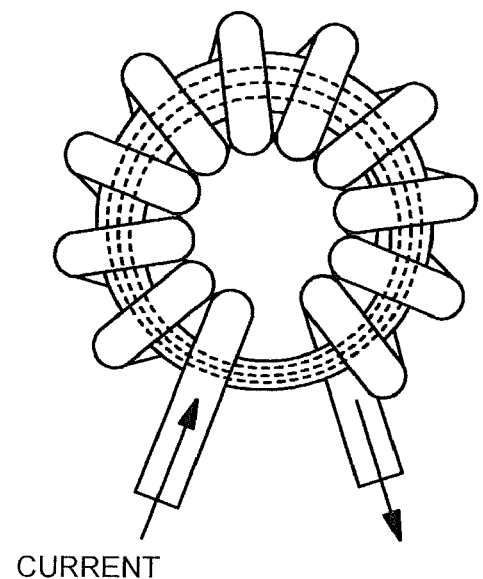
FIGS. 8(a), 8(b) and 8(c) are diagrams that illustrates how the state of the magnetic flux in a magnetic core changes in relation to a change of the magnitude of current that flows through a conductive wire of the inductance element employed in the embodiment 1.
Figure 8B:
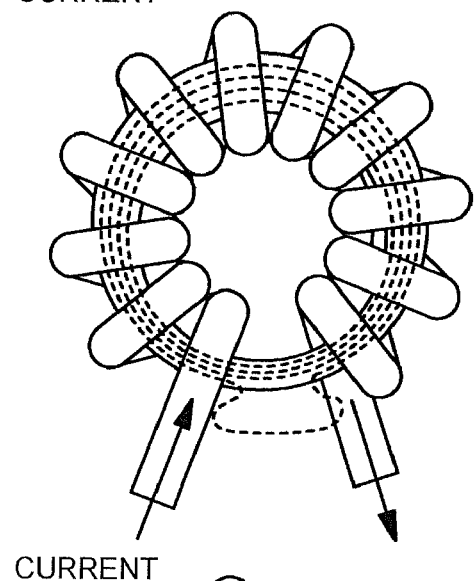
Figure 8C:
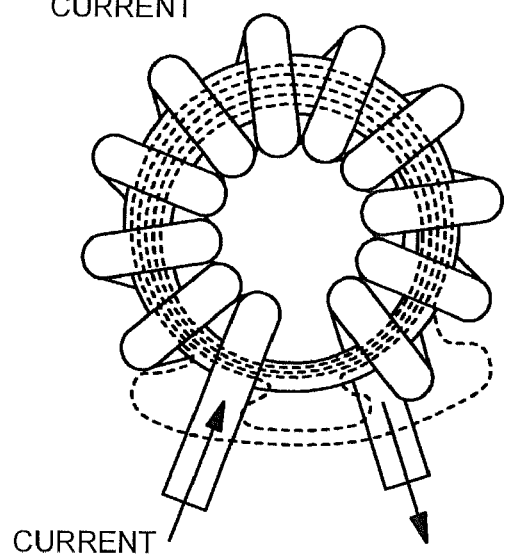

FIGS. 8(a), 8(b) and 8(c) are diagrams that illustrate how the state of the magnetic flux in the magnetic core 62 changes in relation to changes in the magnitude of the current that flows through the conductive wire 64 of the inductance element 60. The magnitude of the current is the smallest in FIG. 8(a), and increases in the order of FIGS. 8(b) and 8(c). The magnetic flux is illustrated by broken lines.

In FIG. 8(a), the magnetic flux density in the magnetic core 62 is smaller than the saturated magnetic flux density of the magnetic material in any portion of the magnetic core 62. Thus, the magnetic flux in the magnetic core 62 does not leak to the outside thereof but remains therein.

As the current that flows through the conductive wire 64 of the inductance element 60 increases, as illustrated in FIG. 8(b), the magnetic flux density begins to be saturated from a portion having a comparatively high magnetic flux density of the magnetic core 62. Then, as illustrated by a broken line, the magnetic flux begins to leak to the outside of the magnetic core 62 partially. A portion of the magnetic core 62 having a comparatively high magnetic flux density corresponds to a portion having a comparatively small cross-sectional area taken along a plane including the central axis of the magnetic core 62, and corresponds to a portion in which the outer and inner circumferences of the magnetic core 62 are close to each other.

As the current that flows through the conductive wire 64 further increases, as illustrated in FIG. 8(c), the portion of the magnetic core 62 having the saturated magnetic flux enlarges. As illustrated by broken lines, the leakage of the magnetic flux from the magnetic core 62 increases.

As described above, as the current that flows through the conductive wire 64 increases, the magnetic flux leaks gradually. Thus, the whole magnetic flux density of the inductance element 60 reaches the saturated state gradually. Thus, the inductance value of the inductance element 60 decreases gradually as the current that flows through the conductive wire 64 increases unlike the inductance element 40.

A change of the inductance value of the inductance element 60 is illustrated by a broken line 54 in FIG. 6. An example of the inductance element having a characteristic of the inductance value as indicated by the broken line 54 is NOCOIL of KABUSHIKI KAISHA NOC.

Figure 9:
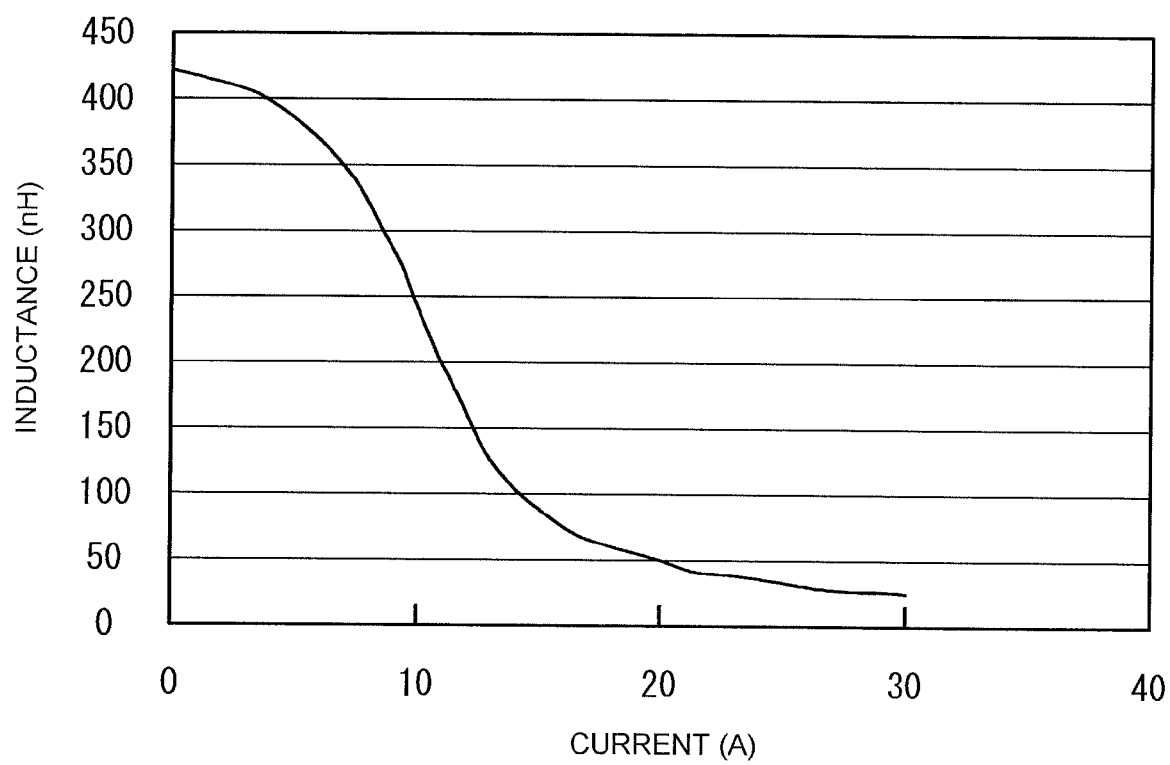
FIG. 9 is a graph that illustrates a characteristic of the inductance value of an inductance element used in a circuit simulation in accordance with the embodiment 1.
Figure 10:
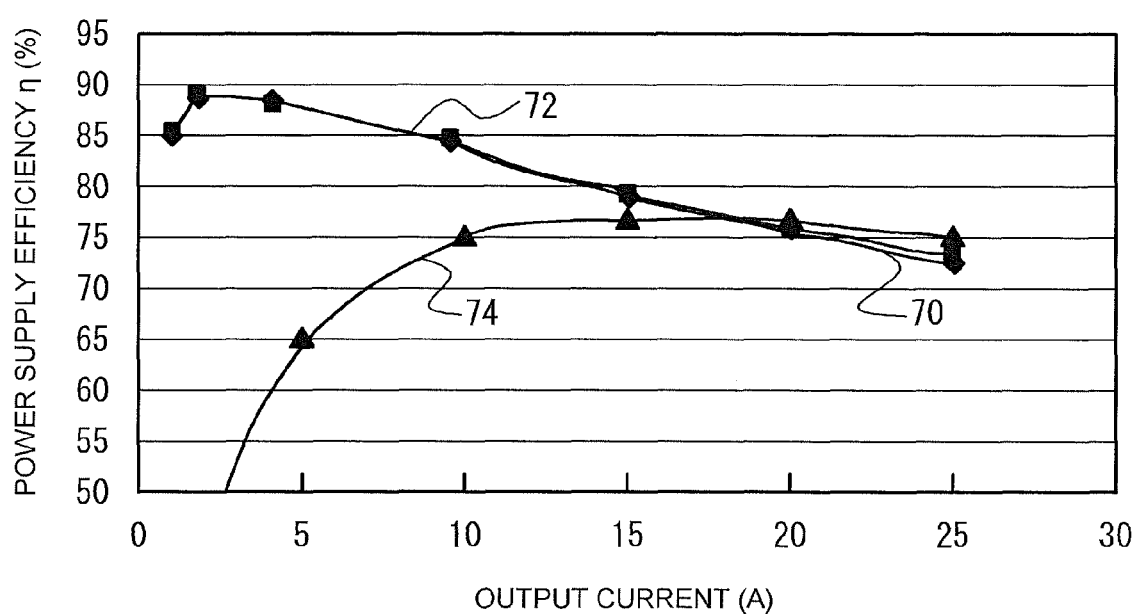
FIG. 10 is a graph that illustrates a change of the power supply efficiency in relation to a change of the output current of the DC-DC converter of the embodiment 1 by a circuit simulation.
Figure 11:
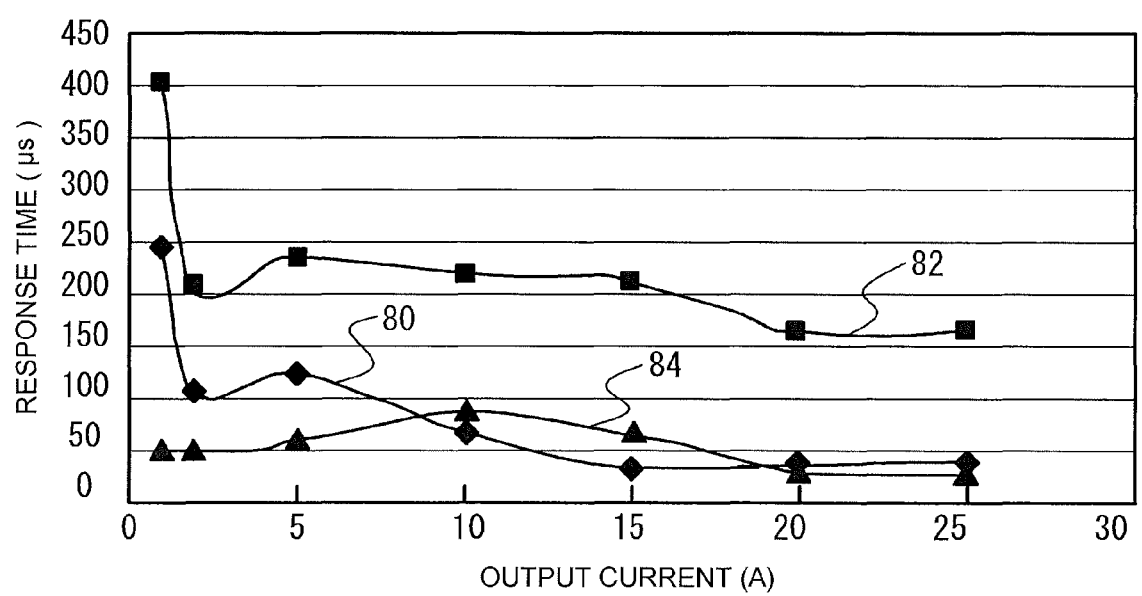
FIG. 11 is a graph that illustrates a change of the response time in relation to a change of the output current of the DC-DC converter of the embodiment 1 by a circuit simulation.

A description is now given of a circuit simulation of the DC-DC converter 10 of the embodiment 1 with reference to FIGS. 9, 10 and 11. The conditions of the circuit simulation are the same as those of the case of FIG. 2.

FIG. 9 is a graph of a characteristic of the inductance value of an inductance element used in a circuit simulation that is illustrated in FIGS. 10 and 11 and will be described later. The horizontal axis indicates the current that flows through the inductance element, and the vertical axis indicates the inductance value. Referring to FIG. 9, the inductance value of the inductance element has a characteristic such that the inductance value is large when the current that flows through the conductive wire is small, and decreases gradually as the current that flows through the conductive wire increases.

FIG. 10 is a graph that illustrates results of a circuit simulation regarding a change in the power supply efficiency in relation to a change of the output current of the DC-DC converter 10. The horizontal axis indicates the output current, and the vertical axis indicates the power supply efficiency. Points described by symbols indicate the results of the simulation, and solid lines 70, 72 and 74 are respectively lines that connect the simulation results. The solid line 70 indicates a case where the inductance element of FIG. 9 is used. For the purpose of comparison with the solid line 70, the solid lines 72 and 74 indicate cases where inductance elements having inductance values of 480 nH and 30 nH are used, respectively. Referring to FIG. 10, it is seen that the power supply efficiency of the case with the inductance element having the characteristic illustrated in FIG. 9 is as high as that of the case with the inductance element of 480 nH for any value of the output current, as indicated by the solid line 70.

FIG. 11 is a graph that illustrates results of a circuit simulation regarding a change in the response time in relation to a change of the output current of the DC-DC converter 10. The horizontal axis indicates the output current, and the vertical axis indicates the response time. Points described by symbols indicate the simulation results, and solid lines 80, 82 and 84 are respectively lines that connect the simulation results. The solid line 80 indicates a case where the inductance element of FIG. 9 is used. For the purpose of comparison with the solid line 80, the solid lines 82 and 84 indicate cases where inductance elements having inductance values of 480 nH and 30 nH are used, respectively. Referring to FIG. 11, it is seen that the response time with the inductance element having the characteristic illustrated in FIG. 9 is as short as that of the case with the inductance element of 30 nH in a range in which the output current is relatively large, as indicated by the solid line 80. It is also seen that the response time is shorter than that of the case with the inductance element having 480 nH even in a range in which the output current is relatively small.

The above-described simulation results show that the DC-DC converter 10 of the embodiment 1 realizes a high response speed without degrading the power supply efficiency.

According to the embodiment 1, as illustrated in FIG. 1, the first switch SW1, which is a switch element, is provided between one end of the DC power source E and one end of the load R, and turns ON and OFF the current input from the DC power source E. The inductance element L is provided between one end of the first switch SW1 of the switch element on the load R side and one end of the load R, as illustrated in FIG. 1, and includes the doughnut-shaped magnetic core 62 and the conductive wire 64 wound around the magnetic core 62. The second switch SW2, which is a commutation switch, is provided between the node between the first switch SW1 of the switch element and the inductance element L and the ground potential, as illustrated in FIG. 1. The capacitance element C2 is provided between the node between the inductance element L and the load R and the ground potential, as illustrated in FIG. 1.

According to the embodiment 1, as illustrated in FIG. 7, the magnetic flux density of the magnetic core 62 varies partially. As illustrated in FIG. 7, as the current input from the DC power source E increases, the magnetic flux in the magnetic core 62 leaks from a portion of the magnetic core 62 having a high magnetic flux density. Thus, the whole magnetic flux density of the inductance element reaches the saturated state gradually as the current increases. Thus, the inductance element has a large inductance when the current is small, and decreases gradually as the current increases. It is thus possible to improve the response speed without degrading the power supply efficiency of the DC-DC converter. Further, since the magnetic flux density of the whole magnetic core of the inductance element L is not saturated rapidly, the current that flows through the inductance element L does not increase rapidly. It is thus possible to prevent the DC-DC converter from being destroyed.

According to the embodiment 1, as illustrated in FIG. 7, the cross-sectional area of the magnetic core 62 taken along the plane including the central axis varies partially. Further, as illustrated in FIG. 7, as the current input from the DC power source E increases, the magnetic flux in the magnetic core 62 leaks from a portion of the magnetic core 62 having a small cross-sectional area taken along a plane including the central axis of the magnetic core 62. Thus, the magnetic flux density of the whole inductance element L reaches the saturated state gradually as the current increases.

Thus, the inductance of the inductance element L is large when the current is small, and increases gradually as the current increases. It is thus possible to improve the response speed without degrading the power supply efficiency of the DC-DC converter. Since the magnetic flux density of the inductance element L is not saturated rapidly in the where magnetic core, the current that flows through the inductance element L does not increase rapidly. Thus, it is possible to prevent the DC-DC converter from being destroyed.

According to the embodiment 1, as illustrated in FIG. 7, the magnetic core 62 is structured so that the outer circumference and the inner circumference have different centers. Further, as illustrated in FIG. 7, the magnetic flux in the magnetic core 62 leaks from a portion of the magnetic core 62 in which the outer and inner circumferences of the magnetic core 62 are close to each other. Thus, as the magnetic flux density of the whole inductance element L reaches the saturated state gradually as the current increases. Thus, the inductance element L has a large inductance when the current is small, and decreases gradually as the current increases. It is thus possible to improve the response speed without degrading the power supply efficiency of the DC-DC converter. Since the magnetic flux density of the inductance element L is not saturated rapidly in the where magnetic core, the current that flows through the inductance element L does not increase rapidly. Thus, it is possible to prevent the DC-DC converter from being destroyed.

Although the DC-DC converter 10 in FIG. 1 used in the description of the embodiment 1 has the general back type of converter circuit, the DC-DC converter may be configured to employ another circuit with the inductance element having an inductance characteristic as illustrated in FIG. 9. Such another circuit may be configured so that the second switch SW2 of the commutation switch is formed by a Schottky barrier diode or may be configured so that an additional circuit for improving the power supply efficiency is employed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A DC-DC converter comprising:
a switch element that is provided between one end of a DC power source and one end of a load and turns ON and OFF current input from the DC power source;
an inductance element that is provided between one end of the switch element on a load-side end and includes a doughnut-shaped magnetic core and a conductive wire wound around the magnetic core;
a commutation switch provided between a node between the switch element and the inductance element and a ground potential; and
a capacitance element provided between a node between the inductance element and the load and the ground potential,
wherein the magnetic core has a shape so that a magnetic flux density of the magnetic core is different depending on a position of a perpendicular cross-section of the magnetic core to a magnetic flux in case that a current through the conductive wire is constant.

2. The DC-DC converter according to claim 1, wherein the magnetic core has the shape so that the magnetic flux of the magnetic core leaks from a portion of a perpendicular cross-section to the magnetic flux having a largest magnetic flux density in the magnetic core as the current through the conductive wire increases.

3. A DC-DC converter comprising:
a switch element that is provided between one end of a DC power source and one end of a load and turns ON and OFF current input from the DC power source;
an inductance element that is provided between one end of the switch element on a load-side end and includes a doughnut-shaped magnetic core and a conductive wire wound around the magnetic core;
a commutation switch provided between a node between the switch element and the inductance element and a ground potential; and a capacitance element provided between a node between the inductance element and the load and the ground potential, wherein the magnetic core has a shape so that an area of a cross-section of the magnetic core taken along a perpendicular plane to a magnetic flux is different depending on a position of the cross-section.

4. The DC-DC converter according to claim 3, wherein the magnetic core has the shape so that the magnetic flux of the magnetic core leaks from a portion of a cross-section having a smallest cross-sectional area of the magnetic core as the current through the conductive wire increases.

5. A DC-DC converter comprising:

a switch element that is provided between one end of a DC power source and one end of a load and turns ON and OFF current input from the DC power source;

an inductance element that is provided between one end of the switch element on a load-side end and includes a doughnut-shaped magnetic core and a conductive wire wound around the magnetic core;

a commutation switch provided between a node between the switch element and the inductance element and a ground potential; and a capacitance element provided between a node between the inductance element and the load and the ground potential, wherein the magnetic core has outermost and innermost circumferences having different centers and being taken along a parallel plane to a magnetic flux.

6. The DC-DC converter according to claim 5, wherein the magnetic core has the shape so that the magnetic flux of the magnetic core leaks from a portion in which the outermost and innermost circumferences are closest to each other as the current through the conductive wire increases.

7. A DC-DC converter comprising:

a switch element that is provided between one end of a DC power source and one end of a load and turns ON and OFF current input from the DC power source;

an inductance element that is provided between one end of the switch element on a load-side end;

a commutation switch provided between a node between the switch element and the inductance element and a ground potential; and a capacitance element provided between a node between the inductance element and the load and the ground potential, wherein the inductance element has an inductance value so as to decrease within a tolerable range of the current through the conductive wire of the inductance element as the current through the conductive wire increases.

8. The DC-DC converter according to claim 7, wherein the inductance element includes a doughnut-shaped magnetic core and a conductive wire wound around the magnetic core.

* * * * *